United States Patent Office 3,230,884
Patented Jan. 25, 1966

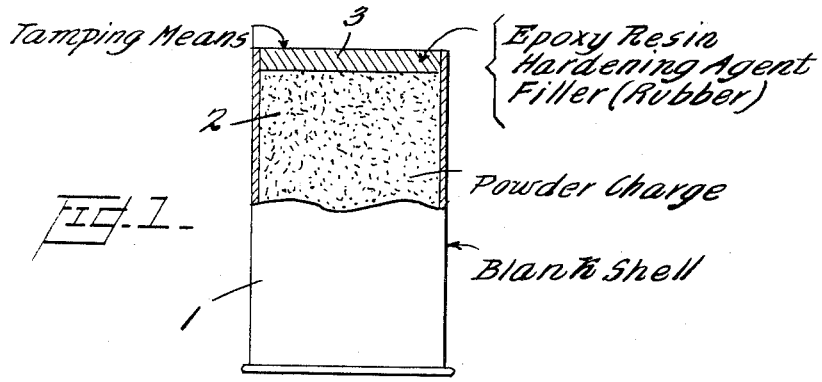
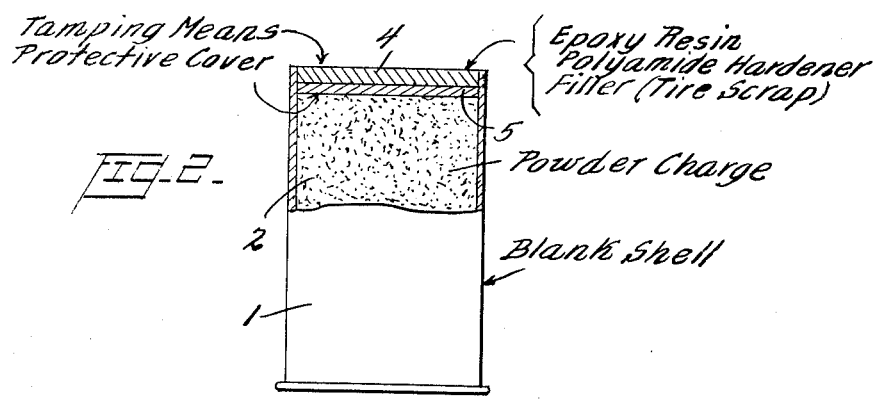
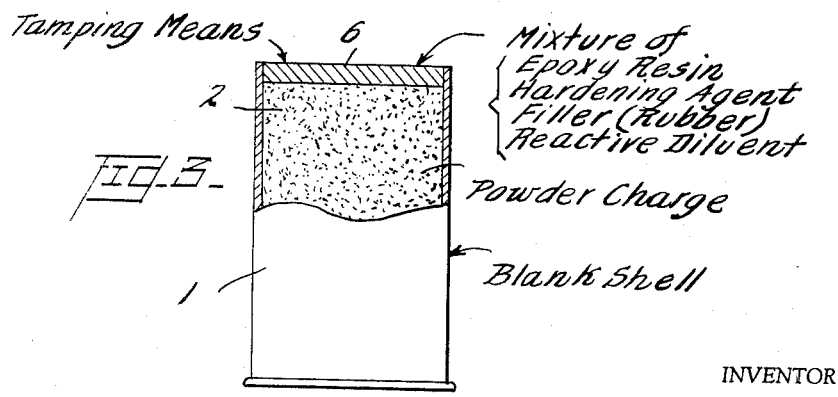

3,230,884
BLANK SHELLS FOR ARTILLERY AND METHOD
OF PRODUCING THE SAME
Wilhelm Clas, Duisburg-Meiderich, Germany, assignor to
Firma Rheinmetall G.m.b.H., Dusseldorf, Germany
Filed Oct. 4, 1963, Ser. No. 314,038
Claims priority, application Germany, Oct. 4, 1962,
P 30,291
7 Claims. (Cl. 102—39)

Blank shells have previously been made by pressing one or more plugs made of cork, compressed cork or the like into the shell case above the powder charge as tamping means and cementing the plug or plugs by means of a suitable adhesive, for example shellac. The plugs employed have heretofore been made in a separate operation, for example, from granulated cork and a suitable binding agent.

It is among the objects of this invention to produce tamping means for a blank shell which, on firing, is reduced to particles substantially smaller than has been the case with known tamping means. A specific object is to provide tamping means which, after firing the blank shell, does not form residues on the inside of the shell case, and therefore which allows the case to be easily cleaned ready for refilling, thus avoiding the considerable amount of work involved in cleaning the used shell cases of known blank shells. A further object of the invention is to produce blank shells which can be packed immediately after manufacture, and in particular which can be packed before the tamping means has hardened.

Other objects and advantages of the invention will be apparent from the ensuing description and from the example illustrating the invention.

The present invention provides a blank shell comprising a shell case, powder charge and tamping means for the powder charge, wherein the tamping means is formed by introducing a non-preformed mixture into the shell case, forming the mixture into a plug by light mechanical pressure, and allowing the mixture to harden, and wherein the said mixture contains the following components:

(a) an epoxy resin
(b) a hardening agent for this resin which effects the hardening without the supply of heat from outside
(c) a filler comprising a comminuted soft vulcanisate of natural or synthetic rubber which contains fibrous material.

The term "epoxy resins" is applied, as is well known, to hardenable compounds containing more than one epoxy group in the molecule. Such resins can be prepared, for example, by reacting polyvalent phenols with epichlorohydrin or by reacting salts of polybasic aromatic carboxylic acids with epichlorohydrin. Also suitable for the method according to the invention are epoxy resins produced by other known methods, for example by epoxidation of suitable unsaturated compounds with the aid of performic acid or peracetic acid.

Conventional so-called cold hardeners may be employed as hardeners for the epoxy resins, that is, compounds which effect the hardening without the supply of heat from outside. Suitable for this purpose are, inter alia, compounds containing amino groups, for example, aliphatic di- or polyamines, such as diethylenetriamine, triethylenetetramine and others. Especially suitable in the present invention are polyamides containing a sufficient number of free amino groups. The latter group of hardeners can therefore be used with advantage for the method according to the invention, because when these are employed the hardening proceeds without any relatively marked spontaneous heating of the tamping mass.

The proportions of epoxy resin and hardener can be obtained from the known formulae for these commercial products.

Comminuted soft vulcanisates of natural or synthetic rubber which contain fibrous material are added to the mixture of epoxy resin and hardener as a filler. The rubber may contain conventional additives, such as, for example, zinc oxide or carbon black. Preferably, so-called carcass meal is employed as a filler. The term "carcass meal" is applied, as is well known, to the comminution products of the side walls of used motor vehicle tires, which contain a relatively high proportion of fibrous material. The grain size of commercial carcass meal is of the order of magnitude of 0.5–3 mm. The carcass meal contains as fibrous material those fibres from which the so-called tire cord was constructed.

Cotton was originally employed for the production of tire cords. Later, a change was made to the use of nylon fibres, if required admixed with cotton, for this purpose. Recently, polyester fibres, for example, the fibres produced by the esterification of ethylene glycol with terephthalic acid and subsequent spinning of the polyester obtained and which have become known under trade names such as Terylene, Dacron, Trevira and others, have been employed for this purpose.

For the production of blank shells in accordance with the invention, commercial carcass meal or rubber meal of various particle sizes containing fibrous material may be used.

The ratio of the quantity of the mixture of resin and hardener to the quantity of the filler in the mixture employed for tamping the powder charge may vary within wide limits. These limits depend on the particle size of the filler employed and on the properties, in particular the viscosity, of the mixture of epoxy resin and hardener. The mixture of the three constituents, when introduced into the shell case, must be capable of being shaped or moulded at a moderate pressure and, moreover, sufficiently sticky to render possible firm adhesion of the tamping means to the wall of the shell case before hardening.

When relatively highly viscous epoxy resins are employed, it is possible to increase the proportion of filler in the mixture by adding to the mixture so-called reactive diluents, for example, phenyl glycide ether or suitable surface-active substances such as, for example, addition products of ethylene oxide and long-chained alcohols or carboxylic acids, thereby reducing the viscosity of the mixture. On the other hand, the mixture should not be too highly fluid before the moulding operation. The appropriate consistency, and thereby the correct ratio between the mixture of resin and hardener and the filler, can be determined in any given instance by a number of preliminary tests. Preferably, about 1–7 parts of the filler are used to about 1 part of the mixture of epoxy resin and hardener (the parts being by weight), although this guide is not intended to constitute a restriction.

To produce the tamping mass, the resin is mixed in a mixing apparatus suited to its viscosity, for example, a kneader, with the hardener and the filler is then added. Of course, the filler may be first mixed with the resin or with the hardener and the remaining component then added. It is possible for the addition of the remaining component to be effected by, for example, spraying.

Conventional shell cases and types of powder may be employed for producing the blank shells according to the invention. It is advantageous to cover the powder charge by a protective covering, for example, by a cardboard cover. After the powder charge has been put in and, if required, covered, the unpreformed mixture of epoxy resin, hardener and filler employed for tamping purposes is placed in the shell case. The quantity of tamping material may vary within wide limits. For a blank shell for guns of 9 cm. calibre, the required quantity is between about 100 and 300 grams. For larger and smaller calibres correspondingly larger or smaller quantities are required. The optimum quantity can be determined easily for each case by preliminary tests.

The paste-like tamping material introduced into the shell case is shaped by light mechanical pressure so that it forms an air-tight plug of approximately uniform thickness sealing the powder charge off at the top and which, after hardening, adheres tightly to the wall of the shell case. The hardening of the plug takes place subsequently without supplying heat from outside.

In practical firing tests of blank shells according to the invention, it has been found that the properties of the blank shells, such as a loud explosion similar to that of a real shot and an intense muzzle flash, are not unfavourably affected by the tamping means used in the blank shells. After firing, the gun barrels were in faultless condition.

The following example illustrates the invention.

200 grams of a commercially available epoxy resin obtained by reacting diphenylol propane with epichlorohydrin were mixed with 100 grams of a polyamide containing free amino groups (a commercial product known as Versamid 140). The mixture of resin and hardener was then mixed with 700 grams of a commercial carcass meal.

600 grams of nitrocellulose in the form of strips 2 cm. wide and 0.5 mm. thick were crumbled into a shell case designed for guns of 10.5 cm. calibre. The powder thus formed was covered by a cardboard cover. 300 grams of the above-described mixture of epoxy resin, hardener and filler were then placed on the cover and formed into a plug of uniform thickness by light mechanical pressure. The shell case was thereafter packed immediately.

The above procedure was repeated, but 1500 grams of carcass meal was mixed with the 300 grams of the mixture of epoxy resin and hardener.

In both cases very serviceable blank shells were obtained. Muzzle flash and explosion corresponded substantially to those of a live round. After firing, no solid constituents whatsoever could be found in front of the barrel. No residues could be seen in the gun barrel. There were no residues of the tamping mass on the wall of the shell case, so that the cases could be refilled without troublesome cleaning measures.

The invention is illustrated on the accompanying drawing in which:

FIG. 1 is a side elevation partly in section of a blank shell, showing the tamping means therein;

FIG. 2 is a side elevation partly in section showing a modified form including a protective cover adjacent the tamping means; and FIG. 3 is a side elevation of a blank shell partly in section showing a modified composition for the tamping means.

The accompanying drawing illustrates the invention by means of three figures, of which FIGS. 1–3 are side elevations partly in section showing the structure of the blank shell with the tamping means. In the figures of drawing, 1 indicates the blank shell and 2 is the powder charge. In FIGS. 1 and 3 numerals 3 and 6 indicate the tamping means and in FIG. 2 the tamping means 4 is provided with a protective cover 5 which may be composed of cardboard.

What I claim is:

1. A blank shell for artillery, comprising a shell case containing a powder charge and tamping means for the powder charge, said tamping means being in the form of a hardened mixture of an epoxy resin, a hardening agent for the resin which effects the hardening without any supply of heat from outside, and a filler comprising a comminuted soft vulcanisate of a rubber selected from the group consisting of natural rubber and synthetic rubber and containing a fibrous material.

2. A blank shell as claimed in claim 1, wherein the filler is a comminution product of the side walls of motor vehicle tires.

3. A blank shell as claimed in claim 1, wherein the epoxy resin has been prepared by a reaction between a polyvalent phenol and epichlorohydrin.

4. A blank shell as claimed in claim 1, wherein the epoxy resin has been prepared by a reaction between a salt of a polybasic aromatic carboxylic acid and epichlorohydrin.

5. A blank shell as claimed in claim 1, wherein the hardening agent is a polyamide containing a sufficient number of free amino groups.

6. A blank shell as claimed in claim 1, wherein the ratio by weight of the quantity of epoxy resin and hardening agent to the quantity of the filler is within the range of from 1:1 to 1:7.

7. A blank shell for artillery, comprising a shell case, a powder charge within the shell case, a protective cover for the said powder charge, and tamping means for the powder charge and in the form of a hardened mixture of an epoxy resin obtained by reacting diphenylol propane with epichlorohydrin, a polyamide containing free amide groups which effects hardening of the resin without the necessity of outside heat, and a filler comprising the comminution products of the side walls of motor vehicle tires.

References Cited by the Examiner

UNITED STATES PATENTS

| | | | |
|---|---|---|---|
| 313,187 | 3/1885 | Dickerman | 86—10 |
| 2,350,556 | 6/1944 | Hotchkiss | 86—10 |
| 3,087,428 | 4/1963 | Frech | 102—39 |
| 3,103,883 | 9/1963 | Ormanns | 102—39 |

BENJAMIN A. BORCHELT, *Primary Examiner.*

SAMUEL FEINBERG, *Examiner.*